Dec. 10, 1957 R. L. WHITELY 2,816,278

MAGNETIC SWITCHING DEVICE

Filed Oct. 1, 1954

INVENTOR.
Richard L. Whitely

BY Morris A. Rabkin

ATTORNEY.

2,816,278

MAGNETIC SWITCHING DEVICE

Richard Lawton Whitely, Haddonfield, N. J., assignor to Radio Corporation of America, a corporation of Delaware Application October 1, 1954, Serial No. 459,662

8 Claims. (Cl. 340—174)

This invention relates to digital information handling systems, and particularly to magnetic devices for performing logical and switching functions in such digital systems.

A number of disadvantages have been encountered in the development of vacuum tube circuits for digital computers. These disadvantages include tube failures, large power-supply requirements and large size. To eliminate such disadvantages in certain applications, magnetic systems have been developed that employ magnetic cores made of material having a substantially rectangular hysteresis characteristic. These magnetic systems have the advantages of small size, relatively small power-supply, and relatively long life.

Among such magnetic systems that have been developed heretofore are those employing magnetic amplifiers. In such a system, for example, a magnetic amplifier unit is used to perform various storage, logical, and switching functions including the functions of a storage register, a flip-flop, and an "and" circuits.

Accordingly, it is among the objects of this invention to provide:

A new and improved magnetic device for performing logical and switching functions;

An improved and simple magnetic device for performing logical and switching functions that is reliable in operation;

An improved magnetic device for performing logical operations that is economical in construction;

An improved apparatus for performing storage and switching operations.

In accordance with this invention, a magnetic device includes a saturable magnetic core and circuit means for driving the core alternately from an initial state of saturation to the opposite state and back to the initial state. This circuit means includes a winding linked to the core, and means for applying pulses of alternately opposite polarities to the winding. Means are employed for applying input pulses to the circuit means to inhibit those pulses that tend to drive the core from the initial state. A load impedance is conneced in series with the winding and both pulse applying means in the same series circuit. An output pulse is produced across the load impedance only upon the occurrence of an input pulse. A stepping register may be provided by connecting in cascade a plurality of these devices. A magnetic device according to this invention may have an output circuit that includes another winding linked to the core, a unilateral impedance and a load impedance. This output circuit produces an output pulse only in the absence of an input pulse and when there is a change of state of the core.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
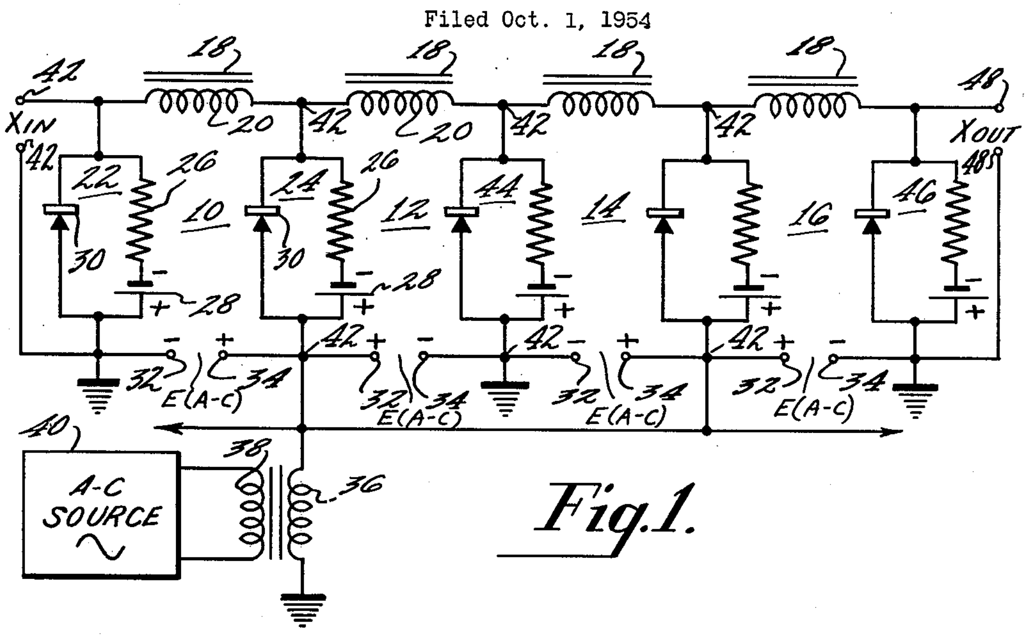
Figure 1 is a schematic circuit diagram of a magnetic stepping register embodying this invention.
Figure 2:
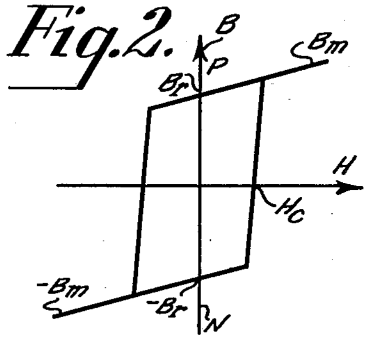
Figure 2 is an idealized graph of a hysteresis curve of a magnetic core used in the device of Figure 1.

Referring to Figure 1, a plurality of magnetic devices 10, 12, 14, 16 are connected in cascade as a stepping register. The devices 10, 12, 14, 16 are the same, except where noted below. Therefore, only the first device, 10 is described in detail. A saturable magnetic core 18 is employed that preferably has a substantially rectangular hysteresis curve of the type shown in Figure 2. Desirable characteristics of the core material are a high saturation flux density $B_m$, a high value of residual flux density $B_r$ and a low coercive force $H_c$. Opposite directions of flux in the core 18 are represented by P and N.

A winding 20 is linked to the core 18 and is connected at one end to one of a pair of input terminals 42, the other of which is connected to a reference potential shown as ground. The other end of winding 20 is connected to a load circuit 24. The load circuit 24 includes a resistor 26, a direct voltage source shown as a battery 28 and a diode 30, all connected in series in the same loop and with the diode 30 poled to pass current from the positive battery terminal to the resistor 26. The junction of the diode 30 and resistor 26 is connected to the coil 20. The junction of the diode 30 and battery 28 is connected to one terminal 34 of a pair of alternating current (A.-C.) terminals 32, 34. The A.-C. terminals 32 of the first and third devices 10, 14 are connected to ground, as are the A.-C. terminals 34 of the second and fourth devices 12, 16. The A.-C. terminals 34 of the first and third devices 10, 14 are connected to one end of the secondary 36 of a transformer, as are terminals 32 of the second and fourth devices 12, 16. The other end of the transformer secondary 36 is grounded. An A.-C. source 40 is connected to the primary 38 of the transformer. The pulse source 40 may include a sine-wave oscillator (not shown). Thus, the same A.-C. power supply is used for all the devices 10, 12, 14, 16. The input terminals 42, A.-C. terminals 32, 34, load 24 and winding 20 of each device 10, 12, 14, 16 are connected in the same series circuit.

The input to the first device 10 may be the output of a preceding magnetic device (not shown). Under such circumstances, the load circuit of that preceding device is connected between input terminals 42. The load circuit 24 of device 10 is connected between the input terminals 42 of the succeeding magnetic device 12. In the same manner, the output load 44 of the second device 12 is the input load of the third device 14, and so on. The voltage across the output load 46 of the last device 16, at the terminals 48, is the output voltage. The A.-C. voltage at terminals 32, 34 of the first and third devices 10, 14 and of alternate succeeding devices (not shown) is a half cycle out of phase with respect to the voltage at terminals 32, 34 of the second and fourth devices 12, 16 and alternate succeeding devices (not shown).

Figure 3:
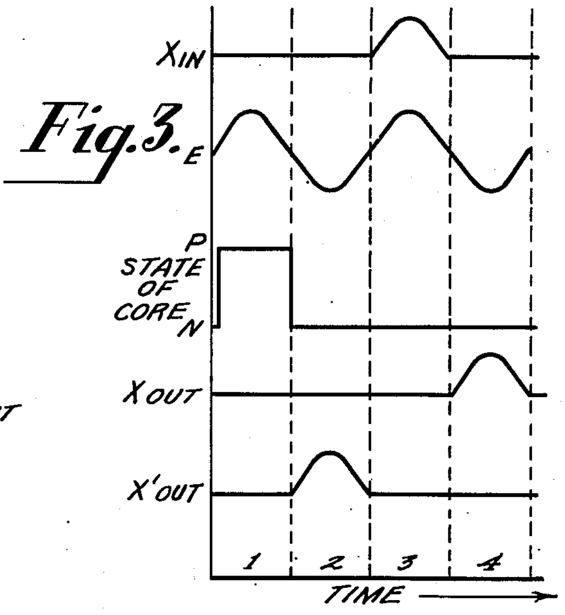
Figure 3 is an idealized graph of waveforms occurring in portions of the circuit of Figure 1 and Figure 4.

Waveforms occurring in portions of the circuit of Figure 1 are shown in Figure 3. The core 18 of the first device 10 is assumed to be initially in state N. The A.-C. voltage applied to the terminals 32, 34 may be a sine wave E. The first half cycle of the sine wave is hereinafter called a positive pulse, and the second half cycle a negative pulse. The input pulses at terminals 42 of the first device 10 are positive-going with respect to ground and are substantially coincident with the first half cycle of E. Shown in Figure 1 are the relative polarities of the voltages at A.-C. terminals 32, 34 existing during time interval 1. At that time, it is assumed that there is no input pulse. A positive-going pulse is applied to the A.-C. terminal 34 of the first device 10 which is passed by diode 30 of the output load circuit 24 through winding 20 to drive core 18 from state N to state P. During time interval 2, the pulse applied to terminal 34 of the first device 10 is negative-going, and the core 18 is driven from state P back to state N. Substantially the full voltage E is dropped across the impedance of the winding 20 in reversing the state of the core, and there is a negligible voltage drop due to E across the output load 24.

The current in the output load circuit 24 due to the battery 28 and the resistor 26 is of the order of twice the magnetizing current through the winding 20 produced by E. During the second half cycle of E, the magnetizing currents through windings 20 of the first and second devices 10, 12 flow in the same direction through load 24. The current flow through the diode 30 of load 24 is substantially blocked by the sum of these magnetizing currents, but the net current through resistor 26 remains substantially unchanged. Thus, there is substantially no voltage change across resistor 26. Accordingly, in the absence of an input pulse, the first or setting half-cycle of E drives the core 18 of the first device 10 to P, and the second or resetting half-cycle of E returns the core to N without producing an output pulse.

During time interval 3, it is assumed that there is an input pulse that opposes the positive-going setting pulse at A.-C. terminal 34. As a result, the winding 20 is not energized and the core 18 remains in state N. During time interval 4, the negative-going resetting pulse at terminal 34 is presented with a negligible impedance in the winding 20 due to the core 18 already being in state N. Substantially the full voltage E is applied across the load impedance 24 and there is a positive-going output pulse approximately equal in amplitude to E.

The second device 12 operates in the same manner one-half cycle behind the first device 10, that is, the core 18 of the second device 12 is being set to state P at the same time the core 18 of the first device is being reset to state N. It has been shown that in the absence of an input pulse, there is no output pulse across load 24 a half cycle later. When the first device 10 is being reset, and the second device 12 is being set, the positive pulse E at terminal 34 of the second device 12 is not inhibited by any output from the first device 10. Thus, after another half-cycle delay, the second device 12 produces an output in the form of an absence of a pulse. When there is an input pulse at the terminal 42, there is an output pulse produced across the load 24 of the first device 10 that is delayed a half cycle after the input pulse. At this time, the second device 12 is being set and its positive-going pulse E is inhibited. At the next half cycle, therefore, there is an output pulse produced across the load 40. The remaining devices 14, 16 of the stepping register operate in the same manner to step along the input signals in the form of a pulse or the absence of a pulse with a half-cycle delay from one device to the next.

Figure 4:
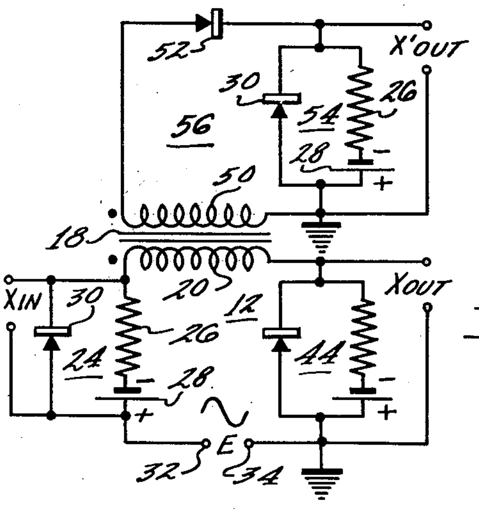
Figure 4 is a schematic circuit diagram of another embodiment of this invention.

Each of the magnetic devices 10, 12, 14 and 16 of Figure 1 may be modified in the manner shown in Figure 4 for the second device 12. The same reference numerals are employed for parts previously described. A second winding 50 is linked to the core 18. Connected in series with the winding 50 is a diode 52 and an output load 54. The output load 54 may be similar to the load 24 shown in Figure 1. The junction of the diode 30 and resistor 26 of the load 54 is connected to the cathode of the diode 52. The junction of the battery 28 and diode 30 of the load 54 is connected to the winding 50.

The relative senses of linkages of the windings 20 and 50 and the polarity of the diode 52 are such that current flows in the forward direction in the diode 52 only when the core 18 is driven to state P only in the absence of an input pulse. Therefore, a pulse is passed by diode 52 in the forward direction when the core 18 is returned to state N, which occurs only when an input pulse was absent during the previous half cycle. An output pulse is produced across the load 54 only in the absence of an input pulse. When there is an input pulse, core 18 does not change its state so that there is no output pulse. Thus, by the addition of circuit 56, the logical operation of negation (that is, X′) may also be provided. Where the negation output X′ is desired without a half-cycle delay, the relative senses of linkage of coils 20 and 50 may be reversed. In that case, the diode 52 passes a pulse when the core 18 is driven to state P.

It is seen from the above description of this invention that an improved magnetic device is provided for switching and logical operations. The circuit is simple, reliable in operation and economical in construction.

What is claimed is:

1. A magnetic device comprising a magnetic element, a winding linking said magnetic element, means for applying pulses of alternately opposite polarities to said winding in a sense tending to drive said element alternately from an initial state and back to said initial state, means for applying input pulses to said winding to oppose those of said opposite polarity pulses tending to drive said element from said initial state, and a load impedance including a diode, said winding, both of said pulse applying means, and said load impedance being connected in series with each other in the same series circuit.

2. A magnetic device comprising a magnetic element, a winding linking said magnetic element, means for applying pulses of alternately opposite polarities to said winding in a sense tending to drive said element alternately from an initial state and back to said initial state, means for applying input pulses to said winding to oppose those of said opposite polarity pulses tending to drive said element from said initial state, and a load impedance, said winding, both of said pulse applying means, and said load impedance being connected in series with each other in the same series circuit, wherein said load impedance includes a resistor, a direct voltage source and a unilateral impedance connected in a series loop, said unilateral impedance and said resistor being connected to said winding to provide parallel current paths for said opposite polarity pulses.

3. A magnetic device comprising a magnetic element, a winding linking said magnetic element, means for applying pulses of alternately opposite polarities to said winding in a sense tending to drive said element alternately from an initial state and back to said initial state, means for applying input pulses to said winding to oppose those of said opposite polarity pulses tending to drive said element from said initial state, and a load impedance, said winding, both of said pulse applying means, and said load impedance being connected in series with each other in the same series circuit, and further comprising means for producing output pulses only in the absence of said input pulses including another winding linked to said magnetic element.

4. Apparatus comprising a plurality of magnetic devices, each of said magnetic devices including a separate magnetic element, a winding linking said magnetic element, means for applying pulses to said winding in a sense tending to drive said element alternately from an initial state and back to said initial state, and a load impedance connected in series with said winding and said pulse applying means in the same series circuit, said apparatus further comprising means for applying input pulses to said winding of a first one of said devices to oppose those of said opposite polarity pulses tending to drive said element from said initial state, and means connecting said first device load impedance in series with said winding and said load impedance of a second one of said devices in the same series circuit.

5. Apparatus comprising a plurality of magnetic devices, each of said magnetic devices including a separate magnetic element, a winding linked to said magnetic element, a pair of first terminals connected to said winding, a pair of second terminals connected to said winding for applying input pulses thereto, and an output load impedance connected in series with said winding and said first terminals, said apparatus further comprising means connecting said load impedance of each of said devices between said second terminals of a different succeeding one of said devices, means for applying a reference potential to one of said first terminals of each of said devices, and a common alternating power supply connected to the other of said first terminals of each of said devices.

6. Apparatus as recited in claim 5 wherein said first and second terminals, said winding and said load impedance of each of said devices are connected in series with each other in the same series circuit.

7. A magnetic device comprising a magnetic element, circuit means for alternately applying magnetomotive forces of opposite polarities to said element to drive said element alternately from an initial magnetic state and back to said initial state, said circuit means including a winding linked to said element, and means for applying pulses of alternately opposite polarities to said winding, impedance means for applying input pulses to said circuit means to inhibit those of said opposite pulses tending to drive said element from said initial state, and output impedance means including a diode for producing output pulses upon the occurrence of said input pulses, said winding, both of said pulse applying means and said output impedance means being connected in series with each other in the same series circuit.

8. A magnetic device comprising a magnetic element, circuit means for alternately applying magnetomotive forces of opposite polarities to said element to drive said element alternately from an initial magnetic state and back to said initial state, said circuit means including a winding linked to said element, and means for applying pulses of alternately opposite polarities to said winding, impedance means for applying input pulses to said circuit means to inhibit those of said opposite pulses tending to drive said element from said initial state, and output impedance means for producing output pulses upon the occurrence of said input pulses, said winding, both of said pulse applying means and said output impedance means being connected in series with each other in the same series circuit, wherein said input pulse impedance means and said output impedance means each includes separately a resistor, a direct voltage source and a unilateral impedance connected in a series loop, said unilateral impedance and said resistor being connected to said winding to provide parallel current paths for said opposite polarity pulses.

References Cited in the file of this patent

UNITED STATES PATENTS

| | | |
|---|---|---|
| 2,653,254 | Spitzer et al. | Sept. 22, 1953 |

OTHER REFERENCES

Publication I, AIEE Transactions, part I, Communications and Electronics, pages 442–446, January 1953.